(12) United States Patent
Olsson et al.

(10) Patent No.: US 7,752,121 B2
(45) Date of Patent: Jul. 6, 2010

(54) TRADER ORDER PRESERVATION IN TRADING SYSTEM

(75) Inventors: Johan L. Olsson, Lidingö (SE); Daniel Jensen, Stockholm (SE); Ulf Ahlenius, Bromma (SE); Sven Allebrand, New York, NY (US)

(73) Assignee: OMX Technology AB, Stockholm (SE)

( * ) Notice: Subject to any disclaimer, the term of this patent is extended or adjusted under 35 U.S.C. 154(b) by 891 days.

(21) Appl. No.: 11/396,939

(22) Filed: Apr. 4, 2006

(65) Prior Publication Data

US 2007/0244789 A1 Oct. 18, 2007

(51) Int. Cl.
*G06Q 40/00* (2006.01)
*G06Q 30/00* (2006.01)
(52) U.S. Cl. .......................................... 705/37; 705/26
(58) Field of Classification Search .................... 705/37, 705/26
See application file for complete search history.

(56) References Cited

U.S. PATENT DOCUMENTS

| | | | |
|---|---|---|---|
| 4,412,287 A | 10/1983 | Braddock, III | |
| 7,246,093 B1* | 7/2007 | Katz | 705/37 |
| 2001/0037284 A1* | 11/2001 | Finkelstein et al. | 705/37 |
| 2002/0116317 A1 | 8/2002 | May | |
| 2003/0097311 A1* | 5/2003 | Shinohara et al. | 705/26 |
| 2003/0177086 A1* | 9/2003 | Gomber et al. | 705/37 |
| 2003/0225673 A1* | 12/2003 | Hughes et al. | 705/37 |
| 2004/0030630 A1 | 2/2004 | Tilfors et al. | |
| 2004/0034591 A1* | 2/2004 | Waelbroeck et al. | 705/37 |
| 2004/0143538 A1* | 7/2004 | Korhammer et al. | 705/37 |
| 2004/0143542 A1 | 7/2004 | Magill et al. | |
| 2004/0210511 A1* | 10/2004 | Waelbroeck et al. | 705/37 |
| 2004/0236662 A1* | 11/2004 | Korhammer et al. | 705/37 |
| 2004/0260639 A1* | 12/2004 | Lundberg et al. | 705/37 |
| 2005/0222936 A1* | 10/2005 | Panariti et al. | 705/37 |

FOREIGN PATENT DOCUMENTS

| | | |
|---|---|---|
| WO | 95/06918 | 3/1995 |
| WO | WO 01/25996 | 12/2001 |

OTHER PUBLICATIONS

Stefan Frey et al., Liquidity supply and adverse selection in a pure limit order book market, Faculty of Economics, University of Tubingen, Germany, Feb. 28, 2005.*
Declaration of Non-Establishment of International Search Report mailed Jun. 27, 2007 in corresponding PCT Application No. PCT/EP2007/052523.
Written Opinion and Search Report mailed Mar. 5, 2008 in corresponding Singapore Patent Application No. 200807082-3.

* cited by examiner

*Primary Examiner*—James P Trammell
*Assistant Examiner*—B. Joan Amelunxen
(74) *Attorney, Agent, or Firm*—Nixon & Vanderhye P.C.

(57) ABSTRACT

A trading system for trading financial instruments, comprising a matching unit for matching received orders having corresponding requirements and an order book for storing unmatched orders is described. The trading system further comprises a decision unit/reinsertion unit connected to the order book for determining when matched orders are to be removed/reinserted based on confirmation of acceptance of the trade received from a user terminal.

12 Claims, 3 Drawing Sheets

TRADER ORDER PRESERVATION IN TRADING SYSTEM

TECHNICAL FIELD

The present application relates to a method and a trading system for trading financial instruments and more specifically a method and a trading system comprising a trader order preservation functionality.

BACKGROUND

In the financial market it is known to have anonymous as well as non-anonymous trading systems for trading in financial instruments.

The term "financial instrument" is in the present application used in a broad sense and encompasses any tradable item (stocks, bonds, securities, cash, foreign exchange, options, gas, electricity, etc.) or group of items that is traded through matching of counterparty orders (bid, offer). An order normally includes a price and a volume of the item(s) or combination of items. The price and the volume can be viewed as order conditions that have to be met in order for a match (deal) to take place.

Although one main purpose of an anonymous trading system is to establish a fair and equal marketplace where no user or party knows the origin of any specific order (bid or offer) on the system, there is sometimes a problem for parties who do not wish to trade with specific counterparties. The most common reason for not trusting other parties is creditability, but there may be other reasons as well.

In non-anonymous systems similar situations may arise (engagement in trades with unwanted counter-parties) if the system is based on automatic matching of orders.

For any trading system that allows at least one of the parties to decline or reject a trade after a match has found by the trading system, there is a problem in that the orders must be reinserted by the parties, thereby losing their priority in the trading system's order book.

SUMMARY

It is an object to overcome at least some of the problems indicated above.

One such trading system is achieved with a trading system comprising a decision unit connected to the order book for determining when matched orders are to be removed based on confirmation of acceptance of the trade received from a user terminal.

Hereby, no alterations are done in the order book until the trade is actually confirmed by the parties. If any party rejects the trade, no change occurs in the order book, thus preserving the status it had when the match was made.

Similarly, a method performing the steps of holding removal of orders from the order book until definite acceptance of the trade has been received is disclosed.

Another such trading system is achieved with a trading system comprising a reinsertion unit connected to the order book for reinserting orders removed from the order book back into the order book with the same priority they had before being removed following a match when the trade is refused based on confirmation of reject of the trade received from a user terminal.

Hereby, the order book is essentially re-constructed to its previous condition whenever a match results in a reject of trade from any of the parties.

Similarly, a method for re-inserting removed orders with retained priority is disclosed.

DETAILED DESCRIPTION

Figure 1:
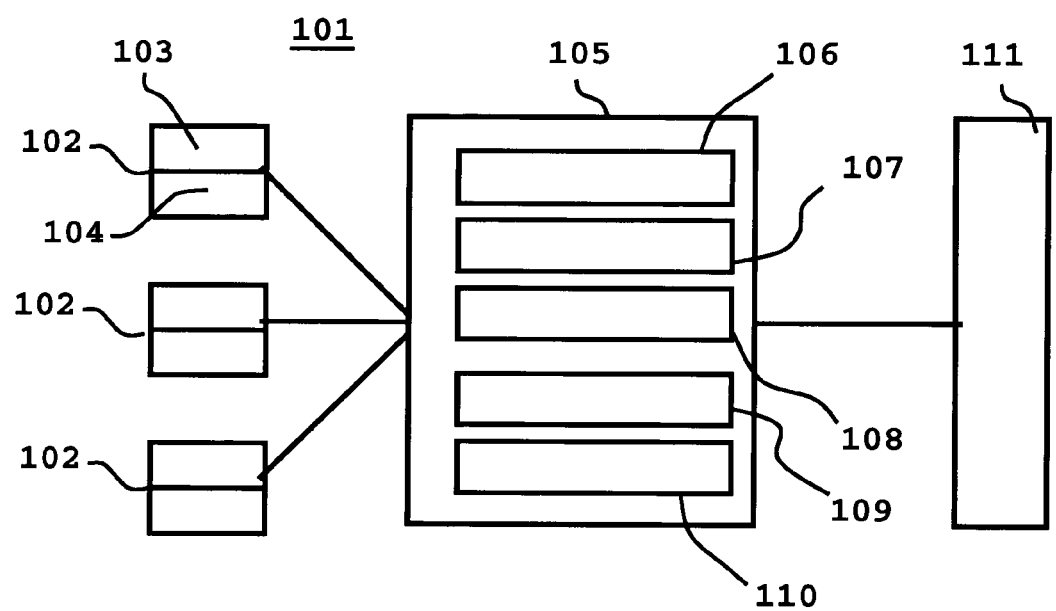
FIG. 1 shows a first non-limiting example embodiment of a financial market system which will be used to describe the invention.

FIG. 1 shows an example embodiment of a financial market system 101. The financial market system 101 is used for trading in financial instruments. In this particular case, the financial market system is an anonymous market place, i.e. no-one is supposed to know the identity of the user behind a certain order. However, the same functionalities and effects can be achieved with a non-anonymous financial market system.

The financial market system 101 essentially comprises three subsystems, each fulfilling certain main functions. In this case, the first subsystem is represented by terminals 102. A terminal 102 is used by the users or traders on the financial market system 101 to receive information about the market via a display 103 and to add information (mainly putting in orders) to the market via a input board 104.

Naturally, display 103 should be regarded in broad sense as any means for presenting information, although preferably a means for visually presenting the information, and the input board 104 should be regarded in broad sense as any means for inputting information, although preferably a means for physically pressing a key (proper keyboard, mouse, etc). The display 103 and input board 104 could also be formed as a common device, such as an interactive screen.

The terminals 102 communicate with a trading system 105, in which the main market events take place. The market system 105 in this embodiment comprises a number of functional units, namely a matching unit 106 for matching orders sent in by the users, an order book 107 for storing unmatched orders, a decision unit 108 for determining if a match should result in the removal of corresponding orders from the order book 107, a user book 109 for identifying allowable users as well as awarding unique alias for the users and an information dissemination unit 110 for inter alia distributing (broadcasting) information from the trading system 105 to the terminals 102.

The figure only displays a symbolic rendering of some of the functions that are preferably implemented in the trading system 105 by hard ware and soft-ware. Regarding the hardware, the trading system 105 may be set up in several different ways using a number of servers and other well known components. Communications can be made through Ethernet, Internet, wire-less, fibre optics, etc.

Finally, there is a settlement system 111 for finalizing (settling) all matched orders.

As an alternative example embodiment the decision unit 108 could be replaced by a reinsertion unit for achieving the same result in a different way, which will be made clear in conjunction with the functional description for FIGS. 2 and 3.

Figure 2:
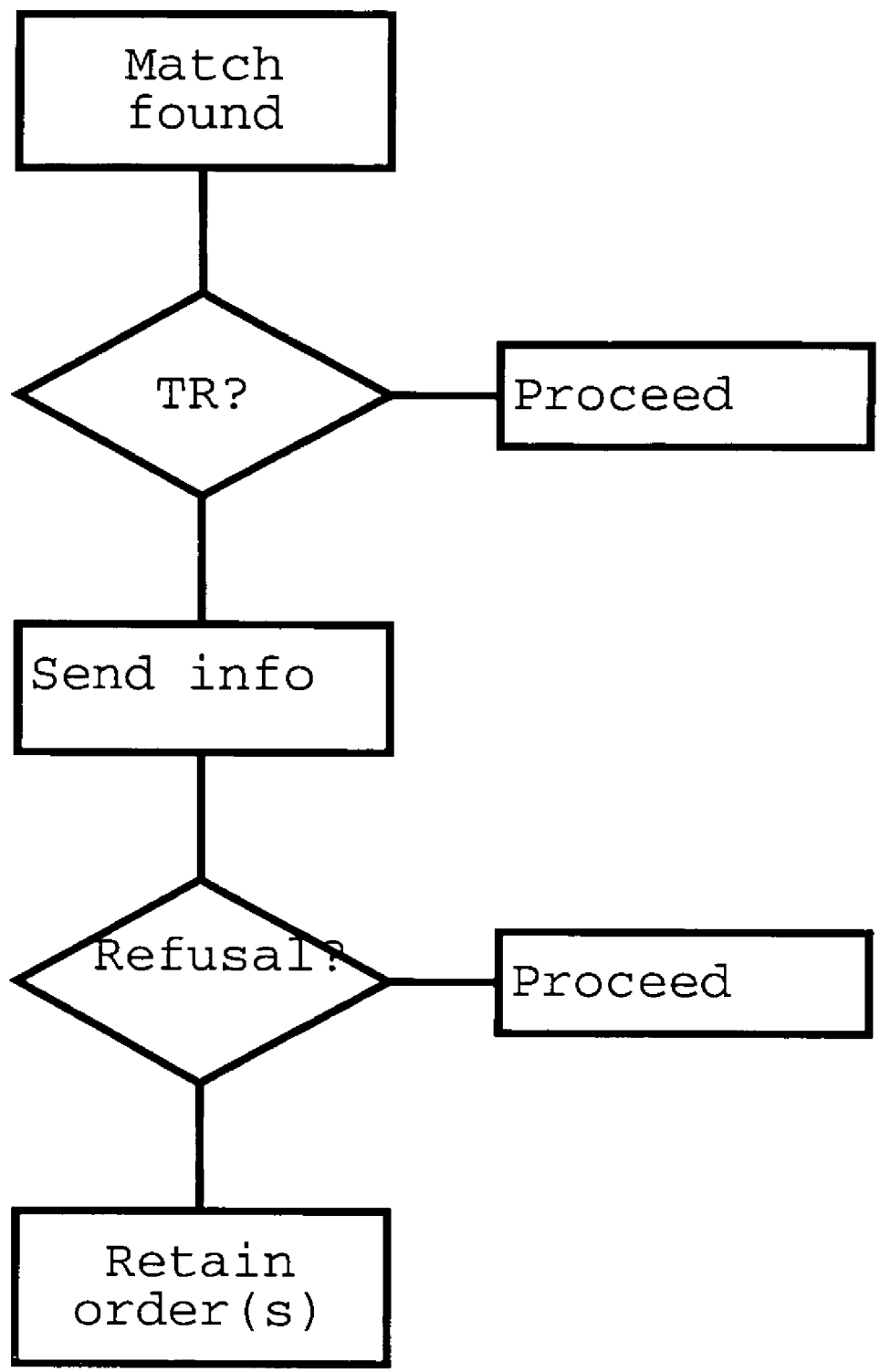
FIG. 2 shows a flow chart describing one non-limiting example embodiment of a method.

FIG. 2 hereby shows a flow chart for describing the purpose and effects of the decision unit 108 in FIG. 1.

Upon finding a match, the decision unit will first determine whether there is a trade refusal requirement in relation to any of the orders. (In case all orders contain a trade refusal requirement this step is not necessary.) If there is no such requirement, the trade will take place and is proceeded with (removal of orders from order book and sending trade to the settlement system).

Should there be a trade refusal requirement implemented in one of the orders, the decision unit sends out information of the match to the parties, allowing one or more of them to respond (preferably within a set time limit) by accepting the trade or refusing it. If the trade is accepted, the procedure is continued as with a normal trade (removal of orders from order book and sending trade to settlement system).

It the trade is rejected one of two things happen. If the system allows crossing orders in the order book, all orders are retained in the order book (and set to be unmatchable by the decision unit). If the system does not allow crossing orders, the order having highest priority is retained and the order with the lowest priority is removed with return information to the party sending in the order that the order was removed because trade was rejected.

Figure 3:
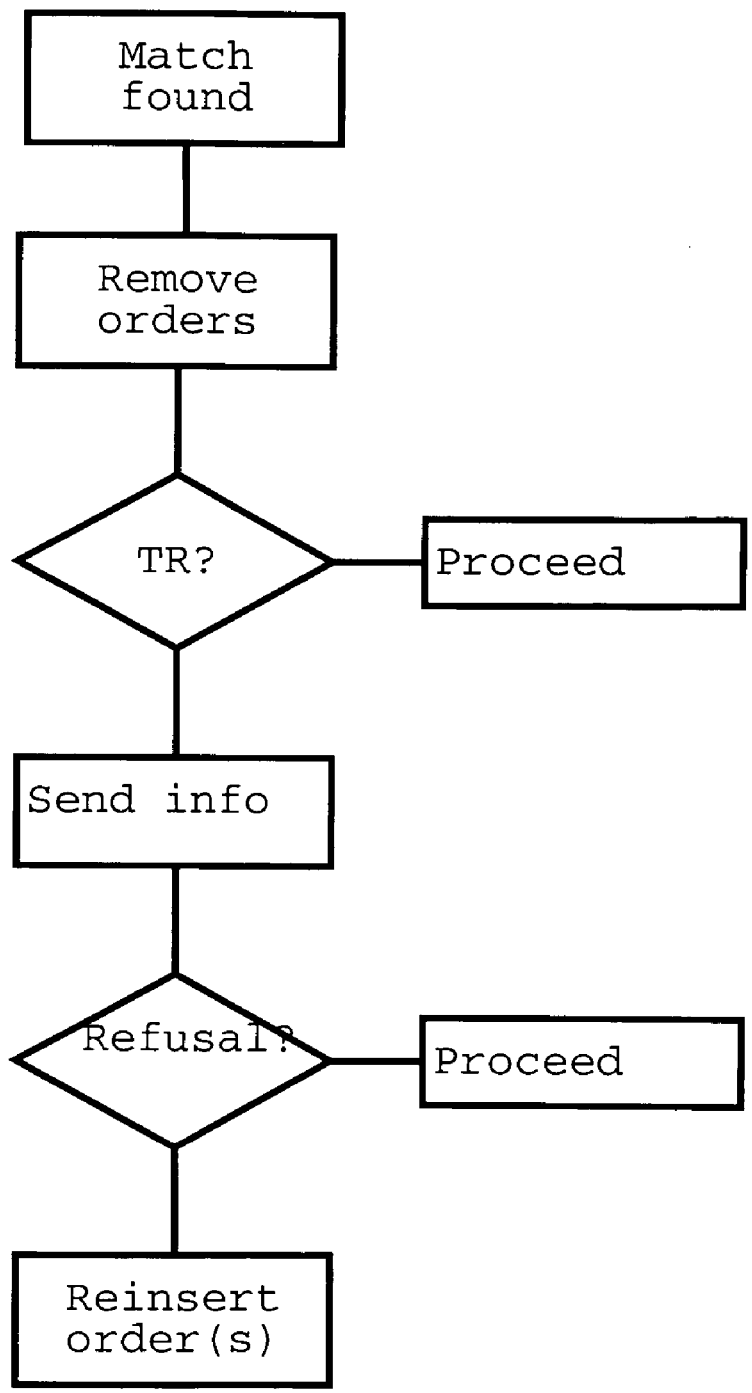
FIG. 3 shows a flow chart describing an alternative embodiment of a method.

In FIG. 3 a flow chart is shown indicating the procedure when using a reinsertion unit instead of a decision unit in the system in FIG. 1.

As soon as a match is found, the orders are removed from the order book. If a trade reject procedure is not possible, the trade proceeds as normal (settlement).

If trade rejection is possible, information is send out to the relevant parties (preferably with a time limit for responding).

Should there not be any trade refusal, the trade is proceeds as normal. But if there is a trade refusal, one of two actions is taken by the reinsertion unit.

If the system allows crossing orders, both orders are put into the order book with the same priority they had when they were removed. At the same time the orders are noted as being unmatchable.

If the system does not allow for crossing orders, the reinsertion unit selects the order having the highest priority and returns this to the order book (with that priority) and removes the other order (preferably sending info the party that sent in the order).

We claim:

1. A trading system for trading financial instruments, comprising:
    a computer-based matching unit for matching received instrument trade orders having corresponding trade requirements;
    a memory for storing an order book with unmatched trade orders; and
    a computer-based decision unit connected to the memory for determining that a matched trade is associated with a trade order that allows the party placing the trade order to reject or decline the trade match after the match occurs; and wherein the computer-based decision unit is arranged to remove the trade order from the trade order book after a message is received from a user terminal confirming that the party accepts the trade match, rather than rejecting or declining the trade match.

2. The trading system in claim 1, wherein the trading system is an anonymous trading system.

3. The trading system in claim 1, wherein the matched trade order remains unaltered in the order book until the message is received from a user terminal confirming that the party accepts the trade match.

4. The trading system in claim 1, wherein the computer-based decision unit is arranged to remove the one or more matched trade orders from the order book when the match occurs if all of the one or more trade orders for the matched trade order do not allow any party placing one of the matched trade orders to reject or decline the trade match.

5. A method for maintaining an order book in a computerized trading system, comprising:
    a computer-based matching unit matching two or more trade orders in an order book of the computerized trading system;
    a computer-based decision unit determining that the matched trade can be rejected by a party associated with one of the matched trade orders after the match occurs and then sending information of the matched trade to the party; and
    the computer-based decision unit determining that the party rejected the matched trade and then retaining at least one of the trade orders in the order book.

6. The method in claim 5, wherein the computerized trading system is an anonymous trading system.

7. The method in claim 5, wherein the matched trade orders remain unaltered in the order book until the computer-based decision unit receives confirmation that all the parties to the matched trade accept the trade match.

8. The method in claim 5, wherein the computer-based decision unit removes the one or more matched trade orders from the order book when the match occurs if all of the one or more trade orders for the matched trade order do not allow any party placing one of the matched trade orders to reject or decline the trade match.

9. A trading system for trading financial instruments, comprising:
    an order book memory for storing unmatched trade orders;
    a computer server for matching received instrument trade orders having corresponding trade requirements and then removing one or more matched trade orders from the order book;
    wherein the computer server is arranged to reinsert the one or more matched trade orders removed from the order book back into the order book with the same priority as the one or more matched trade orders had before removal when a message from a user terminal associated with one of the matched trade orders confirms a rejection of the matched trade.

10. The trading system in claim 9, wherein the trading system is an anonymous trading system.

11. A method for maintaining an order book in a computerized trading system, comprising:
    a computer-based matching unit matching two or more trade orders in an order book of the computerized trading system;
    a computer-based decision unit detecting the match between two or more trade orders in an order book of the computerized trading system and then removing the matched trade orders from the order book;
    the computer-based decision unit determining that the matched trade can be rejected by a party associated with one of the matched trade orders and then sending information of the matched trade to the party;
    the computer-based decision unit determining that the party rejects the matched trade; and
    the computer-based decision unit reinserting the one or more matched trade orders removed from the order book back into the order book with the same priority as the one or more matched trade orders had before removal when a message from a user terminal associated with one of the matched trade orders confirms a rejection of the matched trade.

12. The method in claim 11, wherein the computerized trading system is an anonymous trading system.

* * * * *